Nov. 15, 1938.          T. J. SCOFIELD ET AL          2,136,909
                WINDSHIELD CLEANER ARM ATTACHMENT
                        Filed Dec. 17, 1935
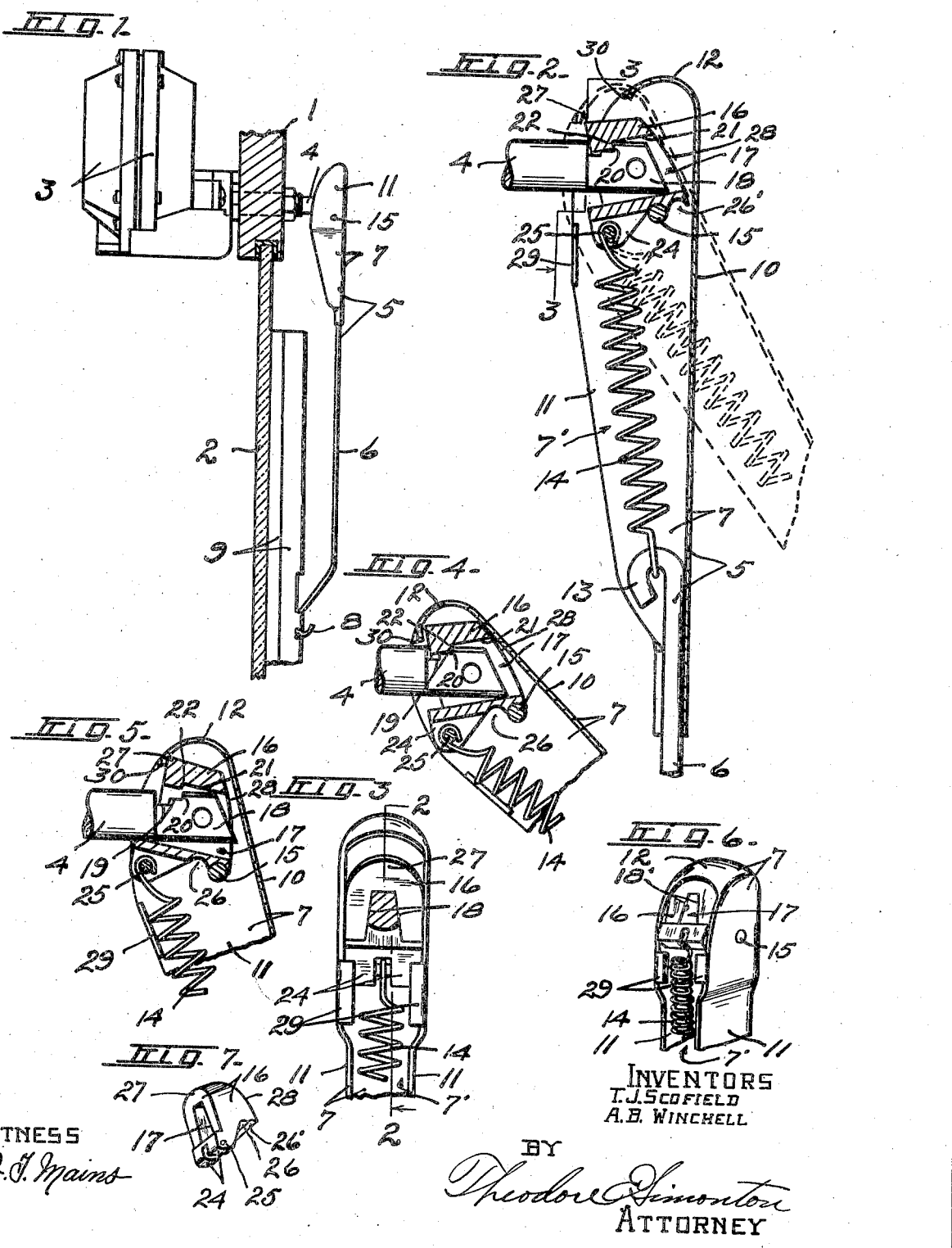
INVENTORS
T. J. SCOFIELD
A. B. WINCHELL
BY
Theodore Simonton
ATTORNEY
WITNESS
J. T. Mains Patented Nov. 15, 1938

2,136,909

UNITED STATES PATENT OFFICE 2,136,909

WINDSHIELD CLEANER ARM ATTACHMENT

Theodore J. Scofield and Arthur B. Winchell, Jackson, Mich., assignors to The Sparks-Withington Company, Jackson, Mich., a corporation of Ohio Application December 17, 1935, Serial No. 54,871

11 Claims. (Cl. 15—255)

This invention relates to certain new and useful improvements in a windshield cleaner arm attachment for securing the wiper blade or squeegee carrying arm to the actuating shaft of a motor or operating device.

In constructing enclosed bodies for motor driven vehicles or the like, it is often desirable and sometimes necessary, particularly in present day streamline designs, to mount the actuating shaft of the windshield cleaner so as to extend in more or less angular relation to the face of the windshield; also certain types of windshields are mounted to swing outwardly for ventilation.

In constructions of the kind mentioned above, the wiper actuating shaft is journaled in the frame of the body adjacent the windshield glass so that it is necessary that the wiper arm have a greater degree of swinging movement relative to the shaft than can be obtained with a spring arm in order to adapt the same to various body and windshield structures.

An object of the invention is to provide attachment means for connecting the wiper arm of a windshield cleaner to its actuating shaft whereby the wiper blade will be maintained in operative relation with the windshield glass with equal wiping efficiency at different relative positions of the windshield glass and wiper shaft which may occur under normal operation conditions.

Another object of the invention is to provide attachment means for windshield cleaners whereby the wiper blade will be resiliently maintained in proper pressure contact with the windshield glass at any desired inclined relative position of the windshield and shaft.

A further object is to provide the wiper arm with means whereby the blade and arm may be swung in a direction away from the windshield glass and be releasably maintained in its outermost position to permit ready cleaning of that portion of the glass beneath the wiper blade and the removal and replacement of the blade.

A still further object of the invention resides in providing an attachment means of the above mentioned class whereby the wiper arm may be quickly and easily removed from or attached to the actuating shaft without the use of a tool. More specifically, I have provided an attachment means whereby the wiper arm may be removed from the wiper shaft by a straight outward pull. That is, the arm is first swung to a cocked position, and then moved longitudinally of the shaft in parallel relation with the axis of said shaft. The arm is placed on the shaft by the same simple process, performed, of course, in the reverse order.

In carrying out the above mentioned objects, the upper end of the wiper blade carrying arm is provided with a housing member adapted to contain the forward end of the actuating shaft therein. Mounted within the housing is an attachment head provided with an opening therethrough for the reception of the forward end of the shaft and which is adapted to permit a limited relative swinging movement of the head upon the shaft. The head and shaft are each provided with co-acting means adapted, upon the relative swinging movement of the head and shaft, to have interlocking engagement with each other for maintaining the head on the shaft against axial displacement. The head is pivotally connected with the housing and a tension spring member is connected at one end to the housing and at the other end to the head for producing the relative swinging movement of the head and shaft to secure the head to the shaft. At the same time, the spring functions for yieldingly urging the wiper arm toward the windshield for maintaining the blade carried thereby in pressure engagement with the surface of the windshield. This structure also permits the wiper arm and blade to be swung away from the windshield glass to provide for ready cleaning of the glass beneath the wiper blade.

Furthermore, there is provided a novel means for maintaining the wiper arm and blade in the outward position in spaced relation to the windshield which, in this instance, comprises in providing for the changing of the pivotal axis of the connection between the attachment head and wiper arm housing member so that upon excessive outward movement of the wiper arm, the pivotal axis will be shifted from one position to another and the attachment head moved thereby into holding engagement with the housing to releasably secure the same to the housing. This securing of the head and housing against relative rotary movement not only maintains the arm and the blade carried thereby in an extended position relative to the windshield glass, but also provides for the ready removal of the wiper arm and attachment head from the actuating shaft or the placement thereof on said shaft. The wiper arm may be readily returned from the outer cocked position to its normal wiping position by exerting a slight pressure thereon to swing the same toward the windshield whereupon the pivotal axis of the wiper arm and attachment head will be shifted to the initial position after which the attachment head and arm will be urged by the tension spring to swing about the pivot for automatically bringing the head into holding engagement with the actuating shaft and the arm to the wiping position.

Other objects and advantages will appear from the following description taken in connection with the accompanying drawing in which:

Figure 1 is a side elevation of a windshield cleaner embodying the various features of this invention and illustrating the same mounted on the frame of a vehicle adjacent the windshield, said windshield and frame being shown in section.

Figure 2 is an enlarged longitudinal central sectional view of the upper end portion of the wiper arm illustrated in Figure 1, taken substantially in the plane of the line 2—2, Figure 3.

Figure 3 is a detail vertical sectional view taken on line 3—3, Figure 2.

Figure 4 is a detail central sectional view similar to Figure 2, illustrating the wiper arm rocked to an extreme position relative to the actuating shaft and the attachment head carried thereby to bring the head and arm into locked relation with each other.

Figure 5 is a sectional view similar to Figure 4 illustrating the head and arm locked against relative swinging movement and the attachment head rocked to a released position relative to the actuating shaft whereby the head and arm may be readily detached from said shaft by a straight outward pull.

Figure 6 is a perspective view of the upper end portion of the wiper arm illustrating the attachment head rocked into locked relation with the housing portion of the arm whereby said arm may be readily mounted upon the actuating member therefor.

Figure 7 is a perspective view of the attachment head.

In Figure 1 there is illustrated a portion of a vehicle frame 1 having a windshield glass 2 mounted therein. The windshield cleaner is shown as comprising a motor 3 mounted upon the frame 1 at one side thereof. The actuating shaft 4 of the motor extends through the frame 1 and has our novel wiper blade carrying arm 5 connected therewith. The arm 5 comprises a rod 6 secured at one end to a housing 7 and has the other end thereof provided with a return bend or hook 8 adapted to operatively engage the wiper blade or squeegee 9 for maintaining the same in wiping engagement with the adjacent surface of the windshield glass 2.

The housing 7 is preferably formed of sheet metal bent to provide a front wall 10, opposed side walls 11 and an upper end wall 12 which provide the housing with a channel recess 7′ extending inwardly from the rear or windshield side of said housing. The lower ends of the front and side walls are contracted and wrapped about the upper end portion of the rod 6 as shown in Figures 1 and 2, and are secured to said rod by soldering, brazing or other suitable means. The upper end of the rod 6 extends a short distance into the interior of the housing 7 and is preferably provided with a return bend or hook 13 for engagement with one end of a tension spring 14. The housing 7 extends some distance beyond the rod 6 and is provided with a pintle or pivot pin 15 spaced transversely of the housing between the side walls 11 thereof a short distance below the upper end wall 12, the ends of said pintle being secured to the side walls 11.

The side walls 11 of the housing are spaced apart at their upper ends a distance sufficient to slidably receive therein an attachment block or head 16, which, in this instance, is provided with an opening 17 extending therethrough from the front to the rear side. This opening 17 is of substantially trapezoidal or inverted keystone shape in cross section for the reception of the forward end of the shaft 4 which, as shown more particularly in Figure 3, has opposed sides thereof flattened as at 18. The flattened sides 18 of the shaft are preferably formed to extend upwardly from the lower peripheral edge of the shaft in slightly converging planes to correspond to the tapered sides 18′ of the opening so as to provide for the proper positioning of the head upon the shaft to effect a positive drive connection therebetween. The upper edge of the shaft 4 is recessed as at 19 a short distance from the outer end thereof which provides a shoulder 20 intermediate the ends of the flattened sides 18 of the shaft. The rear end portion of the opening 17 is of substantially the same height as the forward end portion of the shaft 4, while the upper wall of the forward end portion of the opening 17 is cut away as at 21 so that the forward end portion of the opening is of greater height than the end of the shaft. This provides the upper wall of the opening 17 with a shoulder 22 intermediate the ends of said upper wall adapted to have inter-locking engagement with the shoulder 20 on the shaft 4 when the attachment head is tilted relative to the shaft 4 as illustrated in Figure 2 for preventing the removal of the head from the shaft.

The lower face of the attachment head is provided with a pair of transversely spaced pendant ears 24 adjacent the inner edge thereof in which is mounted a pin 25 adapted to be supportably engaged by the upper end of the hereinbefore mentioned tension spring 14. The lower surface of the attachment head is also provided with a pair of transversely disposed substantially semicircular bearing sockets or recesses 26 and 26′ arranged in close proximity to each other adjacent the forward edge of the head for the reception of the pintle 15 therein. The rear vertical wall of the head is disposed substantially normal to the inner end of the opening 17 and provides a contact surface 27 at the upper rear edge of the head for engagement with the end wall 12 of the housing 7 in a manner and for a purpose presently described. The forward vertical wall of the housing in this instance, is curved from the lower surface upwardly and rearwardly to form a cam surface 28 for contacting the front wall 10 of the housing.

The housing 7 is provided with a pair of limiting stops 29 formed by providing the rear edges of the side walls 11 with lateral projections or ears which are bent inwardly toward each other. The stop members 29 are arranged in a plane slightly below the pintle 15 for engagement with the rear face of the attachment head 16 for limiting the forward movement of the housing 7 and thus prevent pintle 15 from moving out of the rearmost or operating socket 26 into the forwardmost or cocking socket 26′ when the wiper arm is in the wiping position.

The front wall 10 of the housing extends upwardly from the rod 6 in substantially parallel relation with the upper end portion of said rod to a position a short distance above the attachment head 16 and then is curved rearwardly over said head to form the upper end 12. The rear edge as 30 of the end wall 12 is arranged in such spaced relation to the pintle 15 that when the rearmost socket 26 is in engagement with the pintle, the rear end 30 of the wall 12 will freely pass over the upper rear edge 27 of the attachment head when the arm 5 is swung outwardly about the axis of the pintle 15 as a pivot as illustrated by broken lines in Figure 2, and when the pintle 15 is in engagement with the forwardmost socket 26' the rear upper edge or contact surface 27 of the attachment head will be positioned thereby in the path of movement of the rear edge 30 for engagement therewith as illustrated in Figure 5.

It will now be observed by referring more particularly to Figures 1 and 2 that when the windshield cleaner is mounted on the frame of the vehicle adjacent the windshield and the blade 9 is in operative engagement with the windshield glass, the attachment head 16 has the rearmost socket 26 thereof in engagement with the pintle 15 and the spring 14 will function to maintain the pintle in pressure engagement with said socket which thereby limits the upward movement of the wiper arm produced by the spring relative to the shaft 4.

Furthermore, it will be noted that the spring 14 not only rocks the arm 5 rearwardly toward the glass about the axis of the pintle for maintaining the blade in pressure engagement with the glass, but also functions to rock the attachment head 16 about the axis of the pintle 15 to bring the shoulder 22 thereof into interlocking engagement with the shoulder 20 on the shaft 4 and thus prevent the attachment head, and therefore the wiper arm, from being removed from the actuating shaft, due to the spring being connected with the attachment head 16 at the rear of the pintle 15 or, in other words, intermediate said pintle and the plane of the windshield 2.

It will also be observed by referring to Figure 2 that when the attachment head 16 is in the tilted position in operative engagement with the actuating shaft 4, the forward curved surface 28 of the head is spaced from the front wall 10 of the housing 7 so that the housing and the rod 6 connected therewith may be rocked outwardly in a direction away from the windshield 2 a limited distance against the action of the spring 14 or until the front wall 10 of the housing contacts with the surface 28 of the attachment head intermediate the ends thereof, as illustrated by broken lines in Figure 2, whereupon the upper rear edge 27 of the head is positioned within the recess 7' forwardly of the edge 30 of the end wall 12. This outward swinging movement of the housing 7 and rod 6 will obviously space the wiper blade 9 a corresponding distance from the windshield and if it is desired to maintain the arm and blade in this outer position, this may be quickly and easily accomplished by swinging the arm outwardly a slightly greater distance, in the following manner:

As the arm is thus swung outwardly, the front wall 10 of the housing 7, in contacting the front wall or cam surface 28 of the attachment head, will have a cam action which will effect a change in the pivotal connection between the arm and head; in other words, the contacting surfaces will function as a fulcrum about which the pintle 15 is swung outwardly or forwardly by the housing from engagement with the rearmost socket 26 into engagement with the outer or forwardmost socket 26' as illustrated in Figure 4. Inasmuch as the distance between the outermost socket 26' to the upper rear edge 27 of the attachment head is greater than the distance from the innermost socket 26 to said edge 27, the end 30 of the upper wall of the housing 7 will be positioned beneath the edge 27 so that as the arm 5 is released, the spring 14, in rocking the arm rearwardly toward the windshield, will bring the rear end portion of the wall 12 into engagement with the upper portion of the attachment head as illustrated in Figure 5 and maintain the arm in a cocked position by preventing further relative swinging movement of said arm and head. The arm 5 and the blade carried thereby will thus be maintained in the outer extended or cocked position in spaced relation to the windshield against the action of the spring 14.

When it is again desired to return the wiping arm and the blade to the wiping position in contact with the windshield glass, it is only necessary to exert a slight pressure upon the arm 5 toward the windshield whereupon the surface 27 of the attachment head engaged by the adjacent portion of the end 12 of the housing will function as a fulcrum about which the pintle 15 is swung from engagement with the forwardmost or cocking socket 26' into alignment with the rearmost or operating socket 26. As the pintle thus aligns with the rearmost socket, the arm 5 will be carried upwardly by the action of the spring 14 until the pintle engages in the rearmost socket 26. Also, the wall 12 of the housing will be moved out of engagement with the attachment head which then permits the spring 14 to swing the arm and blade into pressure engagement with the windshield.

It will now be observed that when the arm 5 is detached from the wiper shaft 4 and the attachment head 16 is maintained in the uppermost position, as shown in Figure 6, the arm may be mounted on the forward end of the shaft 4 by merely moving the arm toward the shaft with the arm in sufficient inclined relation to the shaft to effect the insertion of the shaft into the opening 17 in the attachment head whereupon the shaft, head and housing will be positioned as in Figure 5 with the arm in the cocked position. As the arm 5 is rocked inwardly toward the windshield to bring the arm into the operative position in the manner hereinbefore described, the spring 14, as the pintle 15 engages the rearmost or operative socket 26, will not only bring the wiper blade into engagement with the windshield glass as the wall 12 is moved out of contact with the attachment head, but will also function to tilt the head relative to the shaft 4 from the position shown in Figure 5 to that shown in Figure 2 for bringing the shoulder 22 of the attachment head into interlocking engagement with the shoulder 20 on the shaft 4 and thus secure the wiping arm to the actuating shaft.

Also the arm may be readily removed from the shaft by simply cocking the arm and then effecting a straight outward pull on the arm to slide the attachment head off of the end of the arm.

Furthermore, owing to the wedge shape of the opening 17 in the head 16 and of the forward end of the shaft 4, the downward pull of the spring 14 will produce and maintain a tight drive connection between the shaft and wiper arm at all times.

Although there is shown and particularly described the preferred embodiment of the invention, it is not wished to be limited to the specific construction shown as various changes both in the size and the relation of the parts thereof may readily be made without departing from the spirit

We claim:

1. In a windshield cleaner, an actuating shaft, a wiper carrying arm member and means releasably securing the arm member to the shaft for swinging movement substantially parallel with the axis of said shaft comprising an attachment head member removably mounted on the actuating shaft to be rocked thereby and to have a limited swinging movement relative thereto in a direction parallel with the axis of the shaft for movement into and out of interlocking engagement therewith, means pivotally connecting the head member to the arm member, and a spring connected with the head and arm members at one and the same side of said pivotal means for rocking said head and arm members in opposite directions about the pivot to bring the head into holding engagement with the shaft and to yieldingly urge the arm member toward the windshield glass.

2. In a windshield cleaner, a wiper arm supporting shaft, an arm element having a channel recess in the face thereof facing a windshield and receiving the end of the shaft therein, an attachment element pivotally mounted in said channel and having an opening receiving said shaft adapted to permit said element to have a limited swinging movement relative to the shaft in a plane substantially parallel with said shaft, the wall of said opening and a surface of said shaft being provided with opposed shoulders and a tension spring connected with said elements eccentric of the pivot for urging relative movement between said elements about the pivot to bring the shoulders into interlocking engagement with each other and to swing the arm element toward the windshield glass.

3. In a windshield cleaner, a wiper arm supporting shaft, an arm element having a channel recess in the face thereof facing a windshield and receiving the end of the shaft therein, an attachment element mounted in said channel and having an opening receiving said shaft adapted to permit said element to have a limited swinging movement relative to the shaft in a plane parallel with said shaft, the wall of said opening and a surface of said shaft being provided with opposed shoulders, one of said elements being provided with bearing socket means extending transversely to the shaft, a pivot pin mounted in the other element and seated in the bearing socket means, and a tension spring connected with said elements eccentric of the pivot for yieldingly maintaining the pin in engagement with the socket means and for urging relative movement between said elements about the pivot axis to bring said shoulders into interlocking engagement with each other and to urge the arm element toward the windshield glass.

4. In a windshield cleaner, a wiper arm operating member provided at its end with a bearing portion, an attachment element connected to said bearing portion to be actuated by the operating member thereby, said element having a bearing socket in one side thereof, a housing member movably receiving the element therein, a pivotal pin extending transversely through the housing member, and a tension spring connected at one end to the attachment element eccentrically to the socket and at the other end to the housing in spaced relation to the pivotal pin for yieldingly maintaining the pin in the socket and urging movement of the housing about the pivotal axis toward a windshield.

5. In a wiper mounting for windshield cleaners having an operating member provided at its end with a bearing portion and a seat, an attachment element mounted on the bearing portion for swinging movement into and out of engagement with said seat, said element having a bearing socket in one side thereof, a wiper-carrying arm element, a pivotal pin connected with the arm element for engaging said socket, and a tension spring connected at one end to the attachment element eccentrically to the socket and at the other end to the arm element in spaced relation to the pivotal pin for yieldingly maintaining the pin in the socket and the attachment element in engagement with said seat.

6. In a windshield cleaner, an operating member provided at its end with a bearing portion and a seat, an attachment head having a seat engaging element integral therewith removably mounted on the bearing portion to be actuated by the operating member, said head having a limited swinging movement laterally of the bearing portion whereby said element may be moved into and out of engagement with the seat for releasably securing the head and operating member together, a wiper-carrying arm element, means pivotally connecting the arm element to the head in spaced relation to the seat engaging element, and means operatively connected with the head and with the arm element and cooperating with the pivotal means for producing said lateral swinging movement of the head to bring the seat engaging element in engagement with said seat of the operating member.

7. A wiper arm for windshield cleaners comprising in combination with a shaft, an attachment head adapted to be removably mounted on said shaft to be actuated thereby, said attachment head and said shaft being provided one with a shoulder and the other with a recess constituting cooperating locking elements adapted to prevent accidental removal of said head from said shaft, a wiper carrying section normally pivoted with respect to said attachment head to be carried thereby and to have free swinging movement with respect thereto toward and from the windshield, means including a spring between said attachment head and said wiper carrying section for urging said wiper carrying section toward the windshield and for producing relative movement of the locking elements to bring them into operative engagement with each other, said attachment head and said wiper carrying section having opposed holding surfaces normally spaced from each other when said carrying section is in its inward position adjacent the windshield, means including actuating elements on the carrying section and on the head coacting with said pivot and with said first mentioned means upon the carrying section being manually moved to an outward position for bringing said holding surfaces into holding engagement with each other and thereby secure said head and said carrying section in predetermined substantially fixed relationship to each other, said holding surfaces and said last mentioned means being so constructed and arranged that the locking elements will remain in the locked position during said movement of the carrier section to bring said holding surfaces into engagement with each other and one of said locking elements will be fixedly connected by the action thereof with the carrying section so as to be subsequently moved by said carrier section during a relatively slight additional movement of said section to effect disengagement of the locking elements so that the head may be removed from the shaft by substantially a straight outward pull.

8. In combination with an actuating shaft adapted to be operated by a windshield cleaner motor, said shaft having a shoulder adjacent the outer end thereof, a wiper arm adapted to be connected at one end with a wiper blade and including a housing member spaced from the forward end of the shaft out of contact therewith, attachment means including a head positioned in said housing member and removably mounted on said shaft to be oscillated thereby, holding means on the attachment head providing a shoulder adapted to pass over the shoulder on the shaft and then to move into its operative position into holding engagement with said latter shoulder to releasably secure the attachment means to said shaft against accidental displacement, pivotal means including a single pintle connecting the attachment means to the wiper arm to permit said arm to freely swing toward and from the windshield and said shoulder of the holding means to move into and out of said operative position with respect to said shoulder on the shaft, and a spring connected with the arm and the attachment means coacting with the pintle to cause movement of said arm and said shoulder of the attachment means relative to each other and to said shaft to both urge the arm toward the windshield and to bring the shoulder of the holding means into said operative engagement with said shoulder on the shaft.

9. In a windshield wiper arm assembly, in combination with an operating member, an attachment head mounted on the operating member to be actuated by said member, a wiper carrying arm element, means including a pivotal pin mounted at one side of the operating member independently thereof connecting the arm element to the head whereby said arm element may freely swing toward and from the windshield, a spring between the attachment head and the arm element for urging said arm element toward the windshield, said attachment head and arm element having opposed surfaces functioning with a cam action and co-acting with the pivotal pin upon excessive swinging movement of the arm element with respect to the attachment head away from the windshield for producing a shifting movement of said head and arm element with respect to each other, and normally spaced holding surfaces fixed on said arm element and head adapted to be brought into co-operative engagement with each other by said excessive swinging and relative shifting movements of said arm element and head for securing said element and head to each other, whereby they will be maintained against relative swinging movement produced by the action of said spring.

10. In a windshield wiper arm assembly, an attachment member provided with a holding element and having an opening for receiving an actuating shaft, said opening being adapted to permit the head to have a limited swinging movement relative to said shaft for bringing the holding element into and out of engagement therewith, a wiper arm member, means including a pintle and a socket therefor associated with the attachment member and arm member for releasably and pivotally connecting said members to each other, a spring connected with the attachment member and with the wiper arm member at one and the same side of the axis of pivotal movement thereof, and means including a shoulder on at least one of said members adapted to be engaged by the other member for limiting said relative pivotal movement of said members produced by the spring when the head member is disengaged from the shaft.

11. In combination with the actuating shaft of a windshield cleaner motor, an attachment member supportably mounted on the forward end of said shaft to be removed therefrom and having connection with said shaft to be actuated thereby, holding means including an element connected with the attachment member and movable into engagement with the shaft adapted to releasably secure the attachment member to said shaft, a wiper carrying arm member pivotally connected with the attachment member to freely swing toward and from the windshield, a spring connected with the arm and attachment members independently of the holding element adapted to both urge the arm member toward the windshield and to render the holding means effective to maintain the attachment member secured to said shaft, and locking and shifting means connected with the attachment member and arm member independently of said spring and holding means so constructed and arranged that upon excessive swinging movement of the arm member away from the windshield, said arm member will be releasably secured to the attachment member and said attachment member will be held in a cocked position relative to the arm against the action of the spring.

THEODORE J. SCOFIELD.
ARTHUR B. WINCHELL.